(«12») United States Patent
Castelli et al.

(10) Patent No.: US 11,449,677 B2
(45) Date of Patent: Sep. 20, 2022

(54) COGNITIVE HIERARCHICAL CONTENT DISTRIBUTION

(71) Applicant: International Business Machines Corporation, Armonk, NY (US)

(72) Inventors: Vittorio Castelli, Croton on Hudson, NY (US); Shikhar Kwatra, Durham, NC (US); Florian Pinel, New York, NY (US); Sushain Pandit, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 16/164,275

(22) Filed: Oct. 18, 2018

(65) Prior Publication Data
US 2020/0125636 A1 Apr. 23, 2020

(51) Int. Cl.
*G06F 40/30* (2020.01)
*G06N 5/02* (2006.01)
(Continued)

(52) U.S. Cl.
CPC .......... *G06F 40/30* (2020.01); *G06F 16/1873* (2019.01); *G06F 16/252* (2019.01);
(Continued)

(58) Field of Classification Search
CPC .... G06F 40/30; G06F 16/285; G06F 16/1873; G06F 16/252; G06N 20/00; G06N 5/022
See application file for complete search history.

(56) References Cited

U.S. PATENT DOCUMENTS 6,598,161 B1 7/2003 Kluttz et al.
9,053,333 B2 6/2015 Furuichi et al.
(Continued)

FOREIGN PATENT DOCUMENTS

CN 1471661 1/2004
CN 107046522 8/2017

OTHER PUBLICATIONS

Lakabi, H., Joshi, J. B., & Ahn, G. J. (2010). Security and privacy challenges in cloud computing environments. IEEE Security & Privacy, 8(6), pp. 24-31.
(Continued)

*Primary Examiner* — Hosain T Alam
*Assistant Examiner* — Anthony G Gemignani
(74) *Attorney, Agent, or Firm* — Lieberman & Brandsdorfer, LLC

(57) ABSTRACT

Embodiments relate to a system, program product, and method for use with an intelligent computer platform and cognitive processing and associated distribution. The embodiments support a mechanism for dynamically sharing critical and non-critical information responsive to a classification model, such that only relevant information or part of the information is shared. As the classification model is subject to modification, the dynamic sharing mechanism is dynamically updated to reflect such modification. Similarly, as an associated document or file is subject to modification, dynamic processing of the document or file takes place responsive to the classification model. The dynamic classification and document processing employ NLP and ML models to support the associated functionality.

20 Claims, 14 Drawing Sheets

(51) Int. Cl.
*G06N 20/00* (2019.01)
*G06F 16/25* (2019.01)
*G06F 16/28* (2019.01)
*G06F 16/18* (2019.01)

(52) U.S. Cl.
CPC .......... *G06F 16/285* (2019.01); *G06N 5/022* (2013.01); *G06N 20/00* (2019.01)

(56) References Cited

U.S. PATENT DOCUMENTS

| | | | |
|---|---|---|---|
| 9,734,169 | B2 | 8/2017 | Redlich et al. |
| 9,959,276 | B2* | 5/2018 | Soeder ................. G06F 21/562 |
| 2003/0046263 | A1* | 3/2003 | Castellanos ........... G06F 16/345 |
| 2010/0169243 | A1* | 7/2010 | Su .......................... G06N 20/00 |
| | | | 706/12 |
| 2010/0312725 | A1* | 12/2010 | Privault ................. G06Q 10/10 |
| | | | 706/12 |
| 2012/0084076 | A1* | 4/2012 | Boguraev ............. G06F 40/242 |
| | | | 704/9 |
| 2013/0305149 | A1* | 11/2013 | Dimitrov ................ G06F 16/93 |
| | | | 715/273 |
| 2015/0379430 | A1* | 12/2015 | Dirac ..................... G06N 20/00 |
| | | | 706/12 |
| 2016/0328480 | A1* | 11/2016 | Owens ................... G06Q 30/02 |
| 2017/0161784 | A1 | 6/2017 | Malik |
| 2017/0193349 | A1* | 7/2017 | Jothilingam ........... G06Q 10/06 |
| 2018/0053128 | A1* | 2/2018 | Costas ................... G06Q 50/18 |
| 2020/0078688 | A1* | 3/2020 | Kaethler ................ A63F 13/67 |

OTHER PUBLICATIONS

Zhongyuan Xu, et al., Mining Attribute-Based Access Control Policies from Logs, Department of Computer Science, Stony Brook University, Aug. 7, 2018, pp. 1-23.

Luke Dickens, et al., Learning Stochastic Models of Information Flow, Apr. 2012.

Gyorgy Szarvas, State-of-the-art Anonymization of Medical Records Using an Iterative Machine Learning Framework, Journal of American Medical Information Association, 2007;14:574-580.

* cited by examiner

| Recipient Category | Atomic Unit | Label |
|---|---|---|
| Category$_0$ | Unit$_0$, Unit$_7$ | 1 |
| Category$_1$ | Unit$_1$ | 1 |
| Category$_2$ | Unit$_3$, Unit$_9$ | 0 |
| Category$_3$ | Unit$_4$, Unit$_8$ | 1 |
| Category$_4$ | Unit$_5$ | 0 |
| Category$_5$ | Unit$_6$ | 1 |

FIG. 7

COGNITIVE HIERARCHICAL CONTENT DISTRIBUTION

BACKGROUND

The present embodiments relate to natural language processing and cognitive content distribution. More specifically, the embodiments relate to recognizing and resolving cognitive content responsive to a hierarchical structure.

In the field of artificially intelligent computer systems, natural language systems (such as the IBM Watson® artificially intelligent computer system or and other natural language question answering systems) process natural language based on knowledge acquired by the system. To process natural language, the system may be trained with data derived from a database or corpus of knowledge relating to the peculiarities of language constructs and human reasoning.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data minimum, visual recognition, and natural language processing to solve problems and optimize human processes.

At the core of AI and associated reasoning lies the concept of similarity. The process of understanding natural language requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying and understanding natural language and processing content response to the identification and understanding as well as changes to the structures are extremely difficult at a practical level.

SUMMARY

The embodiments include a system, computer program product, and method for natural language content processing, including natural language understanding and content distribution processing.

In one aspect, a system is provided for use with an intelligent computer platform to process a file commensurate with a classification model. A processing unit is provided in the system operatively coupled to memory. A tool is further provided in communication with the processing unit, and configured with managers to support and enable file processing. As shown, the managers include a content manager and a classification manager. The content manager functions to partition file content into atomic units. The classification manager functions to correlate the partitioned content with an associated classification model, and more specifically to map the atomic units to the classification model. This mapping enables the content manager to identify a permissive characteristic of the atomic units. An amended version of the file is created based on the classification model and the permissive characteristic identification. This amended file version is populated with atomic units limited to those atomic units that have the identified permissive characteristic.

In another aspect, a computer program device is provided for use with an intelligent computer platform for processing file content responsive to a classification model. The device has program code embodied therewith. The program code is executable by a processing unit to partition file content into atomic units, and to correlate the partitioned content with an associated or identified classification model. More specifically, program code identifies a permissive characteristic of the atomic units responsive to the associated or identified classification model. The program code creates an amended version of the file based on the classification model and the characteristics of the atomic units. The amended version is populated with the atomic units, with the population limited to atomic units having the identified permissive characteristic(s).

In yet another aspect, a method is provided for use by an intelligent computer platform for dynamic processing a file, and more specifically, processing file content. The file content is partitioned into atomic units, which are then mapped to a classification model. The mapping correlates the partitioned content with the model. A permissive characteristic of the atomic units is identified, with the permissive characteristic corresponding to the classification model. An amended version of the file is created and populated with atomic units, with the population limited to the atomic units determined to have the identified permissive characteristic.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

FIG. 7 depicts a block diagram illustrating an example data structure as a tool for atomic unit and an assigned label.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Figure 1:
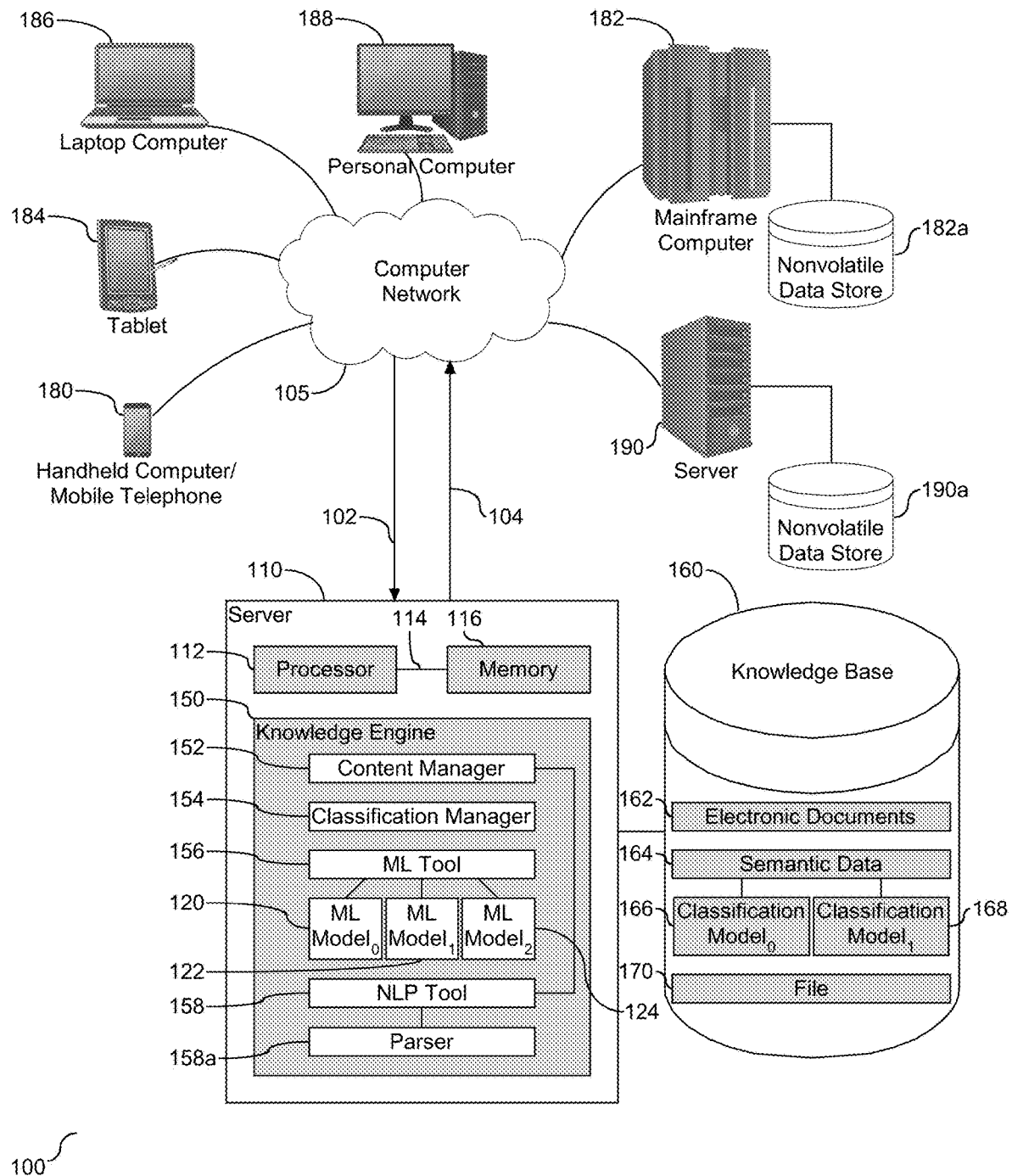
FIG. 1 depicts a system diagram illustrating a schematic diagram of a natural language process system.

Referring to FIG. 1, a schematic diagram of a natural language process system (100) is depicted. As shown, a server (110) is provided in communication with a plurality of computing devices (180), (182), (184), (186), and (188) across a network connection (105). The server (110) is configured with a processing unit (112) in communication with memory (116) across a bus (114). The server (110) is shown with a knowledge engine (150) for natural language processing over the network (105) from one or more computing devices (180), (182), (184), (186) and (188). More specifically, the computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) may enable content and/or context recognition and resolution for one or more content users. Other embodiments of the server (110) may be used with components, systems, sub-systems, and/or devices other than those that are depicted herein.

The knowledge engine (150) may be configured to receive input from various sources. For example, knowledge engine (150) may receive input from the network (105), one or more knowledge bases of corpus (160) of electronic documents (162), semantic data (164), or other data, content users, and other possible sources of input. In one embodiment, the semantic data (164) includes one or more classification models against which content is processed and classified. An example classification model is shown and described in detail in FIG. 2. In selected embodiments, the knowledge base (160), also referred to herein as corpus, may include structured, semi-structured, and/or unstructured content in a plurality of documents that are contained in one or more large knowledge databases or corpus. The various computing devices (180), (182), (184), (186), and (188) in communication with the network (105) may include access points for content creators and content users. The network (105) may include local network connections and remote connections in various embodiments, such that the knowledge engine (150) may operate in environments of any size, including local and global, e.g. the Internet. Additionally, the knowledge engine (150) serves as a front-end system that can make available a variety of knowledge extracted from or represented in documents, network accessible sources and/ or structured data sources. In this manner, some processes populate the knowledge engine (150), with the knowledge engine (150) also including input interfaces to receive requests and respond accordingly.

As shown, content may be in the form of one or more electronic documents or files (162) for use as part of the corpus (160) of data with the knowledge engine (150). The corpus (160) may include any structured and unstructured documents or files (162), including but not limited to any file, text, article, or source of data (e.g. scholarly articles, dictionary, definitions, encyclopedia references, and the like) for use by the knowledge engine (150). Content users may access the knowledge engine (150) via a network connection or an internet connection to the network (105), and may submit natural language input to the knowledge engine (150) that may effectively interface with the semantic data (164). As further described, semantic content is structured content, which may take the form of a classification model. The knowledge base (160) is shown with two classification models, shown as classification model$_0$ (166) and classification model$_1$ (168). Although only two models are shown herein, the quantity should not be considered limiting. Accordingly, as shown and described the knowledge base (160) is operatively coupled to the network (105) via the server (110), and stores content (162) and semantic data (164).

The knowledge engine (150), also referred to herein as an information handling system, is populated with tools in the form of a content manager (152), a classification manager (154), and machine learning (ML) tool (156), and a natural language processing (NLP) tool (158). Although only four tools are shown and described herein, the quantity should not be considered limiting. The content manager (152) functions to interface with one or more files populated in the knowledge base (160). In one embodiment, these files are unstructured documents or files (162), hereinafter referred to collectively as files. The content manager (152) partitions content present in a select file into atomic units. The granularity of an atomic unit is configurable. In an example where the file is a document, an example of the atomic unit may be a paragraph or a sentence, although these are merely examples and should not be considered limiting examples. The classification manager (154) interfaces with both the content manager (152) and the knowledge base (160). More specifically, the classification manager (154) functions to identify or otherwise selects a classification model (166) or (168) from the knowledge base (160) and to correlate the partitioned content of the file against the classification model (166) or (168). The correlations includes the classification manager (154) effectively mapping the atomic units to the selected classification model (166) or (168). It is understood and described in detail below that the selected classification model (166) or (168) identifies permissive or authoritative characteristics of an entity, with different entries in the selected model (166) or (168) corresponding to different permissive characteristics with respect to content. Based on the correlation conducted by the classification manager (154), each atomic unit will have a corresponding permissive characteristic. Accordingly, permissive characteristics of the atomic units are defined in relation to the identified or selected classification model (166) or (168).

The content manager (152) identifies the permissive characteristic of the atomic units, and manages creation of a new or amended file (170) based on the identification. More specifically, the new or amended file (170) is populated with one or more atomic units, and effectively limited to only those atomic units that have the permissive characteristic as identified by the content manager (152). In one embodiment, an original file is amended to remove or add select atomic units. Similarly, in one embodiment, only select entities in the selected classification model (166) or (168) may be authorized to view select data. The permissive characteristic may correspond to the select entities, such that the new or amended file (170) may be populated with the atomic units determined to be accessible by the select entities. It is understood that the new or amended file (170) will be populated with atomic units that correspond to access rights as identified in the classification model. Accordingly, the new or amended file is a physical and tangible element, e.g. article of manufacture, selectively populated with atomic units responsive to permissive characteristics and an associated classification model.

As shown, the knowledge engine (150) includes a ML tool (156). More specifically, the ML tool (156) generates or creates one or more ML models shown herein as ML Model$_0$ (120), ML Model$_1$ (122), and ML Model$_2$ (124). Although only three models are shown, this quantity should not be considered limiting. The ML models are configured to correspond with an identified classification model. For example, the classification manager (154) may identify and/or select a classification model based on an associated identifier, and similarly, the ML tool (156) identifies or creates a corresponding ML model (120)-124). In one embodiment, the ML tool (156) selects the corresponding ML model from a pool of existing models. The selected or generated ML model is configured to interface with the corresponding classification manager (154). For example, in one embodiment, the classification manager (154) identifies a position within the classification model and interfaces with the ML tool (156) to identify a corresponding ML model, e.g. ML model (122), which dynamically creates an amended version of the file (170), e.g. an amended file or an amended article of manufacture. It is understood that the generated file identifies or is otherwise associated with an owner or intended recipient, and the intended owner or recipient has metadata directed at one or more identifying characteristics. The classification manager (154) utilizes the owner or recipient metadata and classifies the owner or intended recipient into a category or position within an associated classification model. Accordingly, the amended file corresponds to the identified position in the classification model.

As shown, the ML tool (156) interfaces with the classification manager (154) and an associated or identified classification model. It is understood that the classification model is not static, and as such is subject to change. Changes or amendments to the classification model are detected by the classification manager (154), and the detection is communicated to the corresponding ML model, e.g. ML model (122). In one embodiment, it is understood that the changes or amendments to the classification model may affect the generated file. The ML model (122) evaluates and identifies the detected changes or amendments to the classification model, and dynamically re-calculates a mapping of the atomic units, which effectively dynamically creates or re-creates an amended version of the file (170), e.g. an amended file or an amended article of manufacture. Accordingly, both the structure and content of the classification model are managed by the classification manager (154), which interfaces with the ML tool (156) to dynamically convey and detect changes or amendments.

The knowledge engine (150) is shown with a NLP tool (158). More specifically, the NLP tool (158) is shown operatively coupled to the content manager (152), with the NLP tool configured to integrate natural language (NL) and associated processing of the NL. As shown and described above, the selected or otherwise identified classification model (166) or (168) may be subject to change, with the generated file (170) selectively amended to correspond with the amended classification model (166) or (168). It is further understood that the file and file content may be subject to change. The NLP tool (158) is configured to detect and process content changes to the file. In one embodiment, the NLP tool (158) processes received content (102), e.g. natural language text, to the knowledge engine (150), so that the content (102) may be interpreted and processed. More specifically, the NLP tool (158) evaluates the detected change(s) to understand the context of the change(s), and in one embodiment to identify similar context within the file. The NLP tool (158) dynamically interfaces with a corresponding ML model (120)-(124) via the ML tool (156), with the corresponding ML model to evaluate the detected content amendment(s), and classify the content amendment(s) and any identified similar context with respect to the classification model. Accordingly, the knowledge engine (150) is configured to process NL and to adaptively integrate the NL with the content manager (152) and the ML tool (156).

In some illustrative embodiments, server (110) may be the IBM Watson® system available from International Business Machines Corporation of Armonk, N.Y., which is augmented with the mechanisms of the illustrative embodiments described hereafter. The IBM Watson® knowledge manager system may receive input content (102) which it then parses to extract the features of the content (102) that in turn are then applied to the corpus of data stored in the knowledge base (160) via the knowledge engine (150). Based on application of the content (102) to the corpus of data, the knowledge engine (150) and associated managers and tools (152) (158) process the content with respect to a classification model and an associated ML model to generate an amended file commensurate with a position or class within the selected or identified classification model (166) or (168).

In particular, received content (102) may be processed by the IBM Watson® server (110) which performs analysis on the language of the input content (102) and the language used. Such analysis may include, but is not limited to, identification and analysis of words and phrases, analogies, analogical patterns, etc., for the input content (102), and identifies similar content populated in the knowledge base (160). Though shown as being embodied in or integrated with the server (110), the NLP tool (158) may be implemented in a separate computing system (e.g., 190) that is connected across network (105) to the server (110). Wherever embodied, the NLP tool (158) detects and categorizes received content (102), and in addition identifies similar content. In one embodiment, the NLP tool (158) utilizes a parser (158a), e.g. linguistic parser, to perform a content and/or sentence structure analysis to parse sentences and denote terms therein. Accordingly, NL language is processed and integrated with the managers and tools of the knowledge engine (150).

Types of information handling systems that can utilize system (110) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet, computer (184), laptop, or notebook, computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a). The nonvolatile data store (182a) can be a component that is external to the various information handling systems or can be internal to one of the information handling systems.

Figure 2:
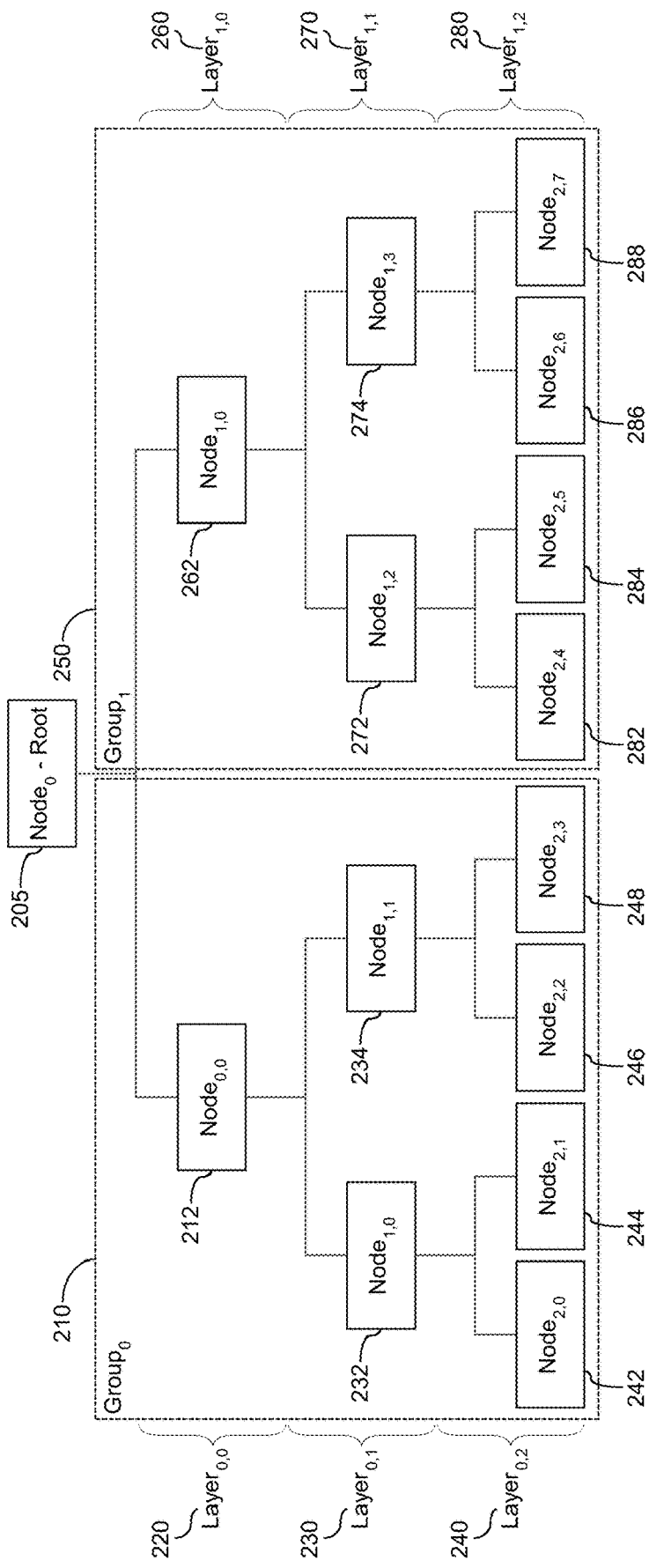
FIG. 2 depicts a block diagram illustrating a schematic representation of a classification model in the form of a hierarchical structure for processing content.

Referring to FIG. 2, a block diagram (200) is provided illustrating a schematic representation of a classification model in the form of a hierarchical structure for processing content. As shown and described in the example, the hierarchy is an inverted tree structure in which a plurality of items are grouped in the layering. As shown in this example, the hierarchy is shown with a root node (205) and two groupings (210) and (250), referred to herein as a first grouping and a second grouping, $group_0$ and $group_1$ respectively. Each of the groupings is shown with multiple layers, e.g. three layers, although the quantity of layers should not be considered limiting. More specifically, the first grouping, $group_0$ (210) is shown with $layer_{0,0}$ (220), $layer_{0,1}$ (230), and $layer_{0,2}$ (240), and the second grouping, $group_1$ (250) is shown with $layer_{1,0}$ (260), $layer_{1,1}$ (270), and $layer_{1,2}$ (280). Each layer within each grouping may have one or more items, referred to herein as nodes. As shown in this example, $layer_{0,0}$ (220) and $layer_{1,0}$ (260) are each shown with one item, including $node_{0,0}$ (212) and $node_{1,0}$ (262), respectively. $Layer_{0,1}$ (230) and $layer_{1,1}$ (270) are each shown with two nodes, including $node_{1,0}$ (232) and $node_{1,1}$ (234) in $layer_{0,1}$ (230) and $node_{1,2}$ (272) and $node_{1,3}$ (274) in $layer_{1,1}$ (270). $Layer_{0,2}$ (240) and $layer_{1,2}$ (280) are each shown with four nodes, including $node_{2,0}$ (242), $node_{2,1}$ (244), $node_{2,2}$ (246), and $node_{2,3}$ (248) in $layer_{0,2}$ (250), and $node_{2,4}$ (282), $node_{2,5}$ (284), $node_{2,6}$ (286), and $node_{2,7}$ (288) in $layer_{1,2}$ (280). The hierarchy shown and the associated quantity and structure of nodes and associated items represented in the hierarchy is merely an example and should not be considered limiting. The hierarchy (200) is directed at a structure to categorize intended recipients and/or associated content. As shown and described herein, content and associated atomic units may be classified or otherwise identified with permissive characteristics responsive to the hierarchical structure. By definition and illustration, assignment of one or more a permissive characteristics is not equivalent to organizing notification categories into a hierarchy. Similarly, use of the hierarchical structure does not necessitate the assignment of a priority to any content. Accordingly, the classification model is shown herein as a hierarchical structure with a representation of categories against which content and associated atomic units are processed.

Figure 3A:
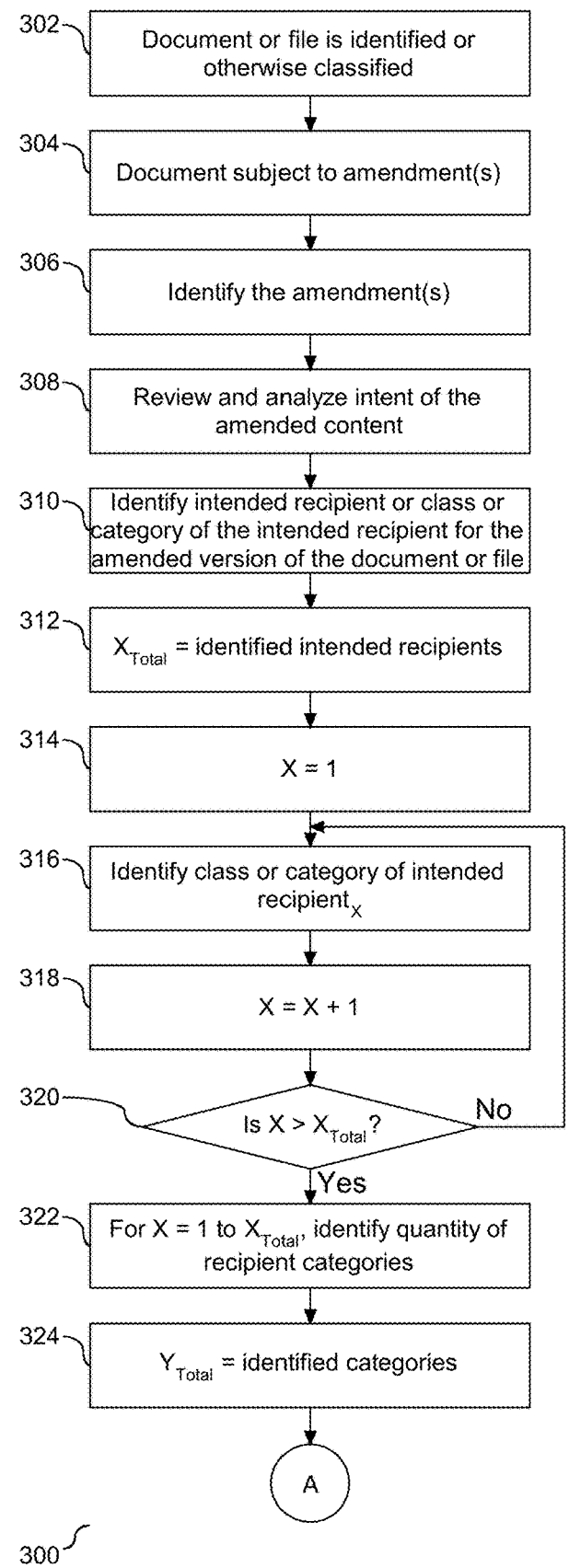
FIGS. 3A and 3B depict a flow chart illustrating training of a machine learning model to process content and associated atomic units.
Figure 3B:
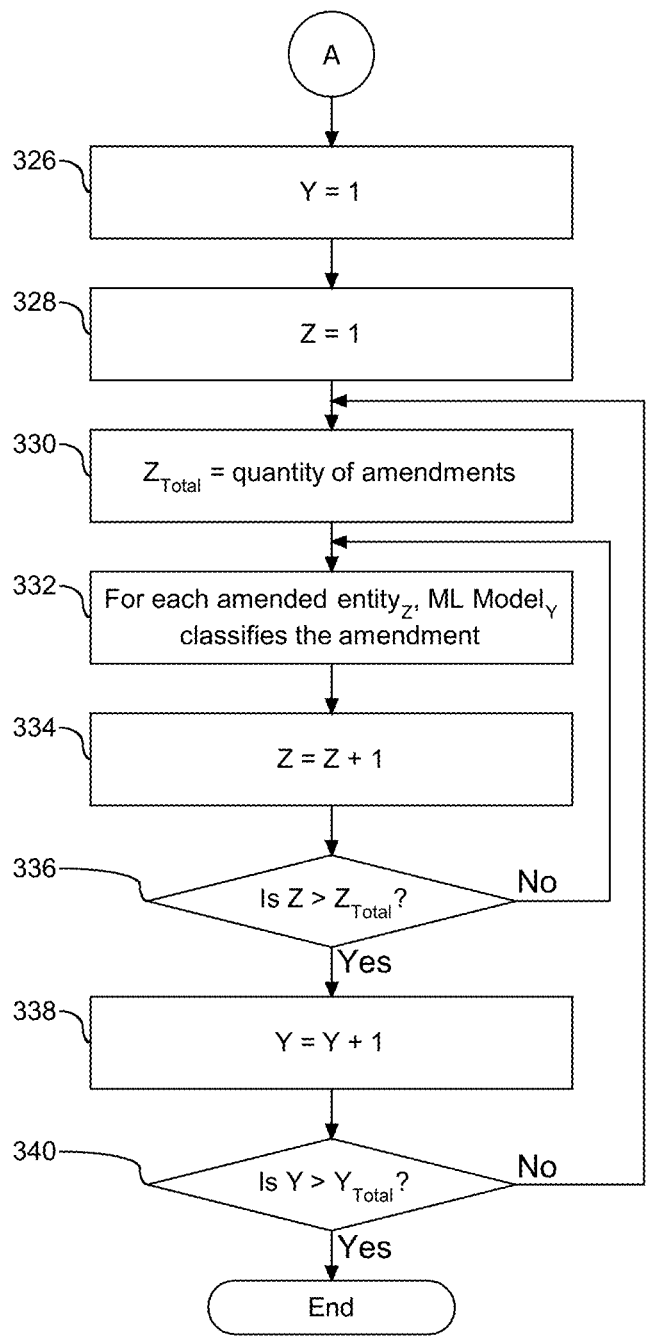

To provide additional details for an improved understanding of selected embodiments of the present disclosure, reference is now made to FIGS. 3A and 3B which depict a flow chart (300) illustrating training of a machine learning model to process content and associated atomic units. As described in FIG. 1, it is understood that a document, e.g. electronic document, and its content may not be static. Content may be added or removed, by an owner of the document or an entity with access to the document, or in one embodiment an entity with authorization or clearance to amend the document. Furthermore, the term document referenced herein may be any form of an electronic file, and should not be limited to a word processing document. Each addition or removal with respect to the document effectively changes the document. As shown, a document or file is identified or otherwise classified (302). In one embodiment, the classification may designate the document as a master copy, although this embodiment should not be considered limiting. At such time as a word or phrase is removed from the document, or in one embodiment added to the document, (304), the amendment(s) to the document or file is identified (306). The amendment(s) to the document or file may occur for a variety of reasons. For example, in one embodiment, the amendment(s) may be to remove content for one or more categories of entities. Similarly, in one embodiment, the amendment(s) may be without consideration of the categories. Accordingly, as the document or file is amended with additions or deletions of content, such amendments are identified.

It is understood that the amended content may be subject to an individual word, phrase, sentence, paragraph, etc. Regardless of the literal amended content, the intent of the amended content is reviewed and analyzed (308) so that similar or equivalent content associated with the document can be identified. In one embodiment, natural language processing (NLP) is employed to understand the context of the amended content. For example, amended content may be in the form of one or more phrases which are parsed to identify a noun-verb relationship, which may then be used as an element in understanding the associated phrase context. It is understood that an entity amending document content has access rights to the document. Similarly, it is understood that in one embodiment, the entity amending the content falls within the hierarchical structure shown and described in FIG. 2, with different tiers in the hierarchy having different levels of clearance for accessing classes of documents or files, or in one embodiment, different levels of clearance with respect to select words or phrases that may be present in one or more documents or files. It is understood that such amendments may be directed at creating a document version that removes restricted material, and thereby provides clearance of the amended document or file version to one or more tiers in the hierarchical structure. Accordingly, multiple document or file versions may be created, with the different versions directed at levels of clearance and document or file access.

The entity amending the document or file has clearance and access privileges to the document. Amending the document or file to remove select material may be directed at creating an amended document or file version for a recipient or select group of recipient. In one embodiment, the amendment may be directed at adding content to the document or file. As such, the changes or amendments to the document or file should not be limited to content removal. Following step (308), the intended recipient or class or category of the intended recipient for the amended version of the document is identified (310). Referring to FIG. 2, it is understood that the recipient identified at step (310) has an associated class or category within the hierarchy. In one embodiment, the identified recipient has an identifier, such as an electronic mail address or login identifier, social media account, etc. The class or category is determined responsive to the recipient identifier. It is further understood that the entity amending the document or file and/or identifying the intended recipient may identify more than one intended recipient, and the recipients may be in the same class or tier within the hierarchy, or in one embodiment, at least two recipients may be classified in at least two different classes or categories in the hierarchy. Accordingly, each intended recipient needs to be evaluated responsive to the designation or identifying with respect to the document amendments.

As shown, following step (310), the variable $X_{Total}$ is assigned to the quantity of intended recipients is identified (312), and an associated intended recipient counting variable is initialized (314). For each intended recipient, the class or category of the recipient is identified (316), which in one embodiment is responsive to their position with an associated hierarchical structure. Following step (316), the intended recipient counting variable is incremented (318), followed by an assessment if all of the intended recipient have been evaluated (320). A negative responsive to the assessment at step (320) is followed by a return to step (316) for further recipient assessment. Similarly, a positive response to the assessment at step (320) concludes the recipient identification and assessment process.

The document amendments referenced above are explicit changes to the document. It is understood that similar amended language or data may be present in the document. Similarly, it is understood that similar amendments to the document or similar documents or files may be necessitated by the express or identified amendments. A machine learning (ML) model is trained to evaluate the express or identified amendments. For each of the intended recipients that were identified at step (312), a quantity of recipient categories are identified (322). In one embodiment, the quantity of categories may be the same as or different from the quantity of identified recipients. The quantity of identified categories is assigned to the variable $Y_{Total}$ (324), and an associated category counting variable is initialized (326). A ML model$_Y$ is trained to classify the documents phrases. More specifically, an amendment counting variable Z is initialized (328) to assess amended words or phrases, hereinafter referred to as extracted entities. In addition, the variable $Z_{Total}$ is assigned to the quantity of amendments being evaluated (330). For each amended entity$_Z$, the ML model$_Y$ identifies or otherwise classifies the associated amendment (332). Thereafter, the amendment entity counting variable is incremented (334), and it is determined if all of the amendment entities have been identified for ML model$_Y$ (336). A negative response to the determination at step (334) is followed by a return to step (332), and a positive response to the determination at step (336) is followed by an increment of the entities category counting variable (338). Thereafter, it is determined if a ML model has been trained with the document amendments for each category (340). A negative response to the determination at step (340) is followed by a return to step (330), and a positive response concludes the ML model training. Accordingly, as demonstrated herein a ML model is trained for each recipient entity category and with respect to the document amendments.

Figure 4:
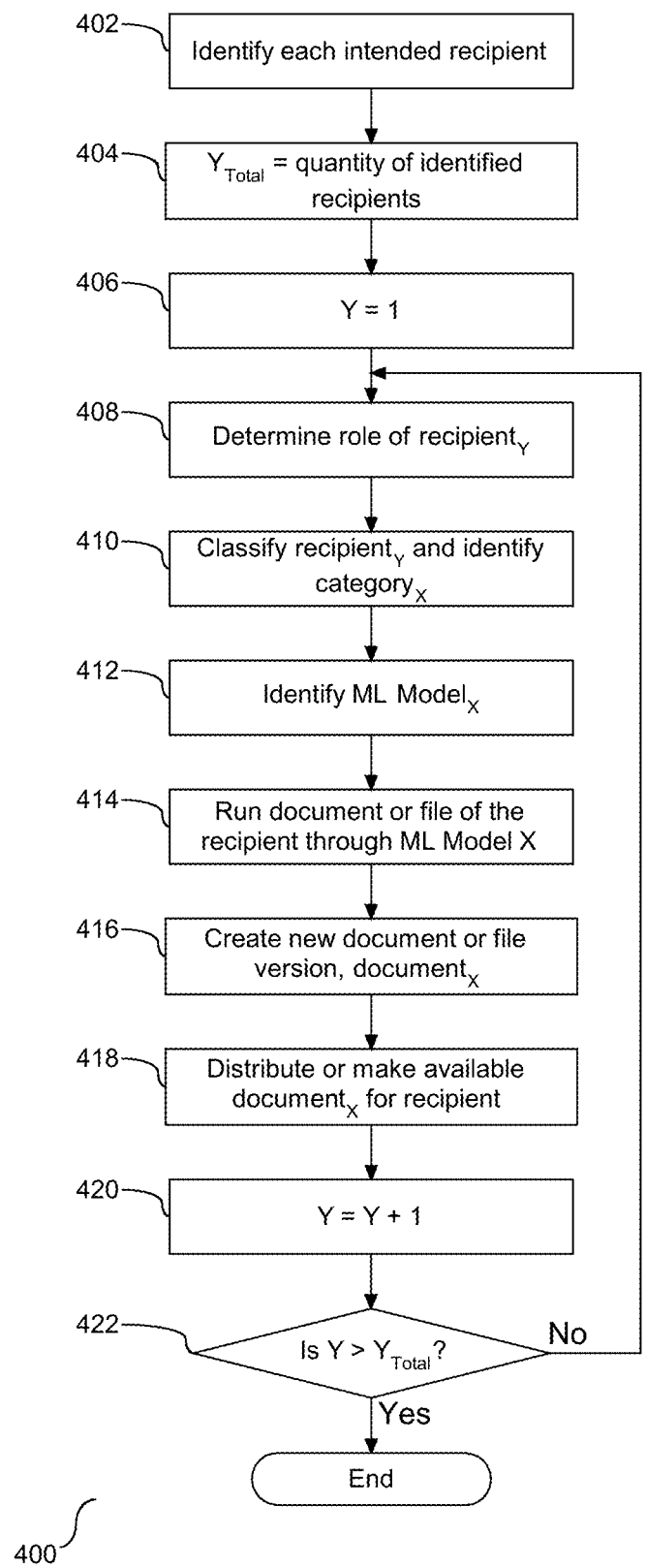
FIG. 4 depicts a flow chart illustrating processing of a document with support of the trained ML model.

As shown and described in FIGS. 3A and 3B, a ML model is trained to address document amendments and identified recipient(s). Referring to FIG. 4, a flow chart (400) is provided illustrating processing of a document with support of the trained ML model. With reference to FIG. 2, it is understood that a recipient or intended recipient of a document may be classified within a hierarchical structure, and with reference to FIGS. 3A and 3B, the ML model is trained responsive to the hierarchical structure. One or more recipients of the document may be intended. Each intended recipient of one or more documents is identified (402) using an identifier or identifying characteristics, as shown and described in FIGS. 3A and 3B. The variable $Y_{Total}$ is assigned to the quantity of identified recipients (404), and an associated recipient counting variable is initialized (406). For each recipient, the role of the recipient is determined (408). Thereafter, the recipient$_Y$ is classified, and the category, category$_X$, of the recipient within the hierarchy or similar categorization is identified (410). The ML model trained in FIGS. 3A and 3B is associated with a category, e.g. ML Model$_X$ trained for category$_X$. Following step (410) and based on the category$_X$ identified, the corresponding ML model is identified (412). The document(s) or file(s) that is the subject document(s) of the recipient is identified and run through the ML model, e.g. ML model$_X$, (414). Accordingly, as shown the trained ML model that corresponding to the recipient category processes the document(s).

The ML model can be utilized to process documents for appropriate amendments. In one embodiment, a select set of amendments may be made in the document, with the ML model making further amendments in the same document, or making amendments in similarly classified documents, as shown and described in FIG. 4. The ML model$_X$ may address express amendments, such as specific words and/or phrases, or in one embodiment, inherent amendments for similar words and/or phrases. After the ML model$_X$ completes the document processing at step (414), a new document or file version, document$_X$, corresponding to the processing is created (416). It is the new document or file version, document$_X$, that is distributed, communicated, or otherwise made available to the identified recipient, recipient, (418). As shown at step (404), there may be more than one intended recipient. Following step (418), the recipient counting variable is incremented (420), and it is determined if the document(s) or file(s) has been processed for each intended recipient (422). A negative response to the determination at step (420) is following by a return to step (408), and a positive response concludes the document processing. Accordingly the ML model(s) creates one or more document versions based on the training of the ML model(s), to support and enable distribution of the create document version(s).

Figure 5A:
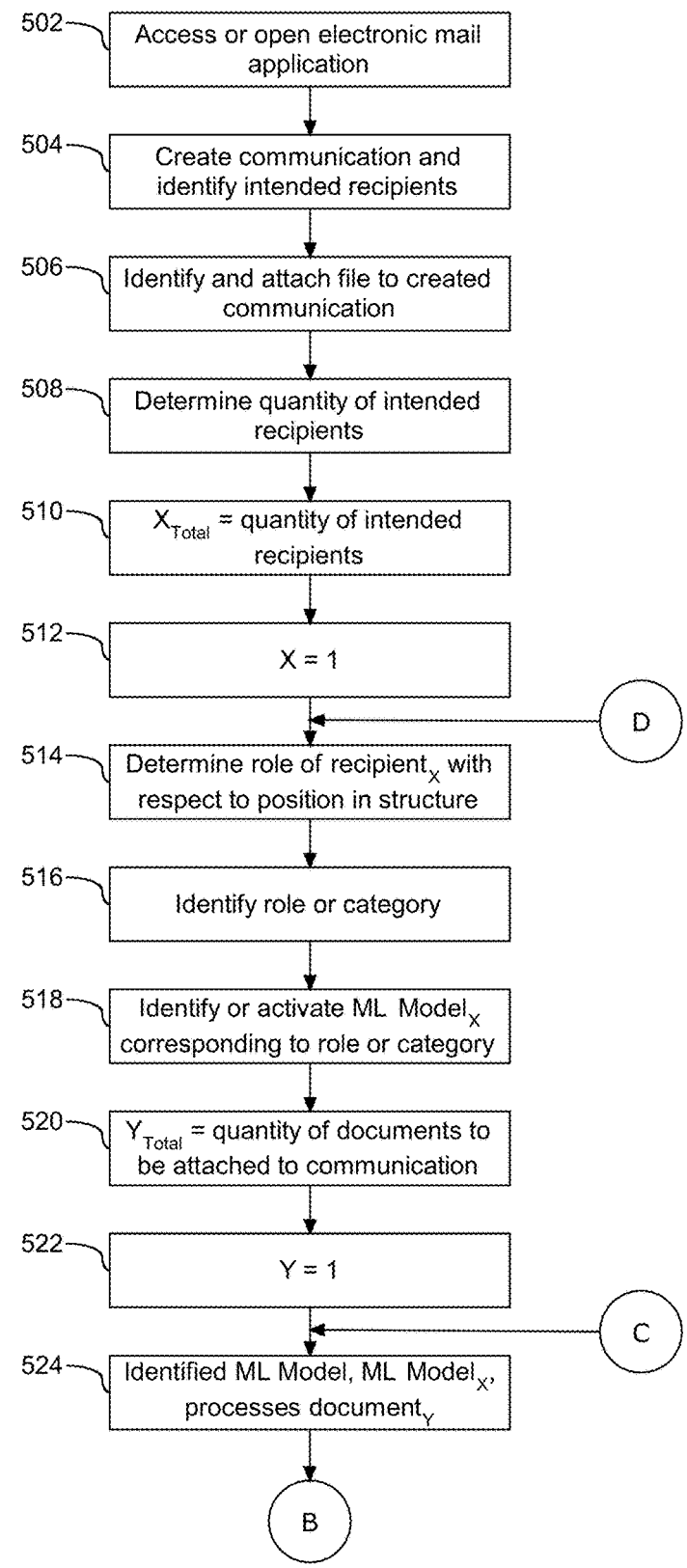
FIGS. 5A and 5B depict a flow chart illustrating a use case of the trained ML model.
Figure 5B:
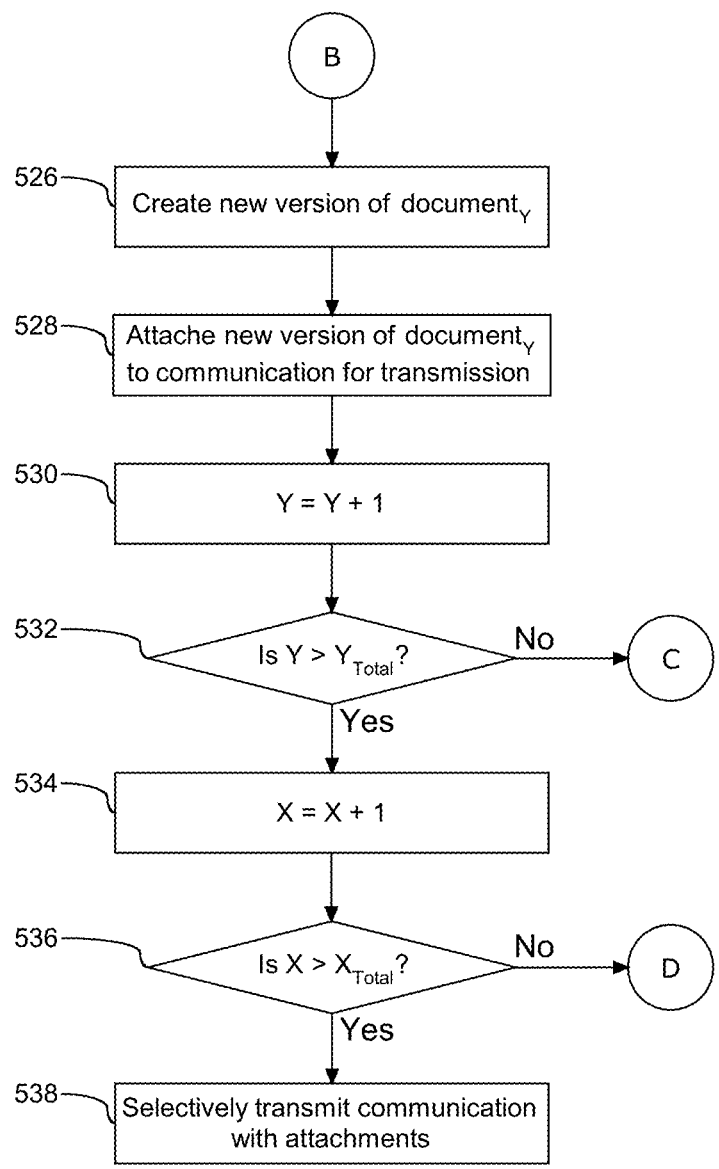

Referring to FIGS. 5A and 5B, a flow chart (500) is provided illustrating a use case of the trained ML model. As shown, an electronic mail application is accessed or opened (502), and a communication is created or otherwise drafted, including identification of one or more intended recipients of the communication (504). It is understood in the art that one or more documents or attachments may accompany an electronic mail communication. In this use case, a document is selected or otherwise identified for attachment to the communication (506). Although a single document is shown herein, it is understood that two or more documents may be selected or otherwise identified at step (506). The quantity of intended recipient(s) identified at step (504) is determined (508). In this example, the variable $X_{Total}$ is assigned to the quantity of identified recipients (510) and an associated recipient counting variable is initialized (512). For each identified recipient, the role of the recipient is determined with respect to their position in a structure (514). Each position in the structure has an associated role. Based on the position in the structure, the associated role and/or category is identified (516), which includes identifying or otherwise activating an associated ML model that corresponds to and has been training for the identified category (518). The variable $Y_{Total}$ is assigned to the quantity of documents selected or identified for attachment to the communication (520), and an associated document counting variable is initialized (522). The identified ML model processes document, which in one embodiment, includes running document$_X$ through the ML model (524). Accordingly, prior to transmission of the electronic communication, the ML model is identified and processes the selected or identified document(s) intended to accompany transmission of the electronic communication.

The processing of the document by the identified ML model, ML model$_X$, creates a new version of the document (526). This new document version is attached to the electronic communication for transmission (528). Following step (528), the document counting variable is incremented (530), and it is determined if each of the selected or identified documents has been processed (532). A negative response to the determination at step (532) is followed by a return to step (524) for processing of document$_Y$, and a positive response concludes the document processing through an identified and trained ML model. As shown at step (510), the communication may identify more than one intended recipient, where two or more recipients may be classified in different categories, thereby requiring a different document version. Following step (532), the recipient counting variable is incremented (534), and it is determined if there are additional intended recipients in the communication (536). A negative response to the determination at step (536) is followed by a return to step (514), and a positive response concludes the document processing for the communication. More specifically, following a positive response to the determination at step (536), the electronic communication together with the processed documents, e.g. attachments, are selectively transmitted to the identified recipient(s) (538). It is understood that a single communication with multiple intended recipients with at least two of those recipients identified in different categories, will selectively transmit the appropriate version of the document to the intended recipient. Accordingly, the usecase shown and described herein applies the ML model processing of an electronic file to an electronic mail application or system.

Figure 6A:
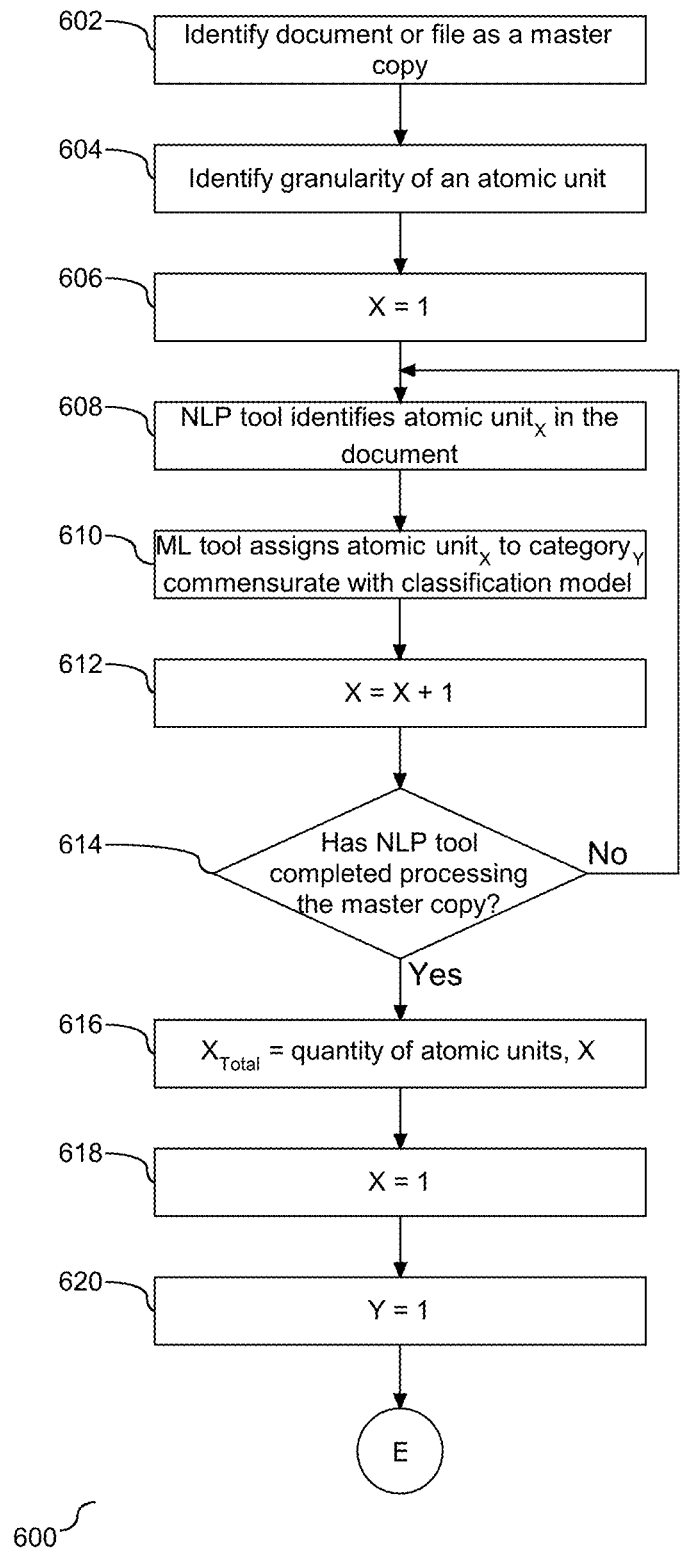
FIGS. 6A and 6B depict a flow chart illustrating another embodiment for processing a document with respect to one or more recipients.
Figure 6B:
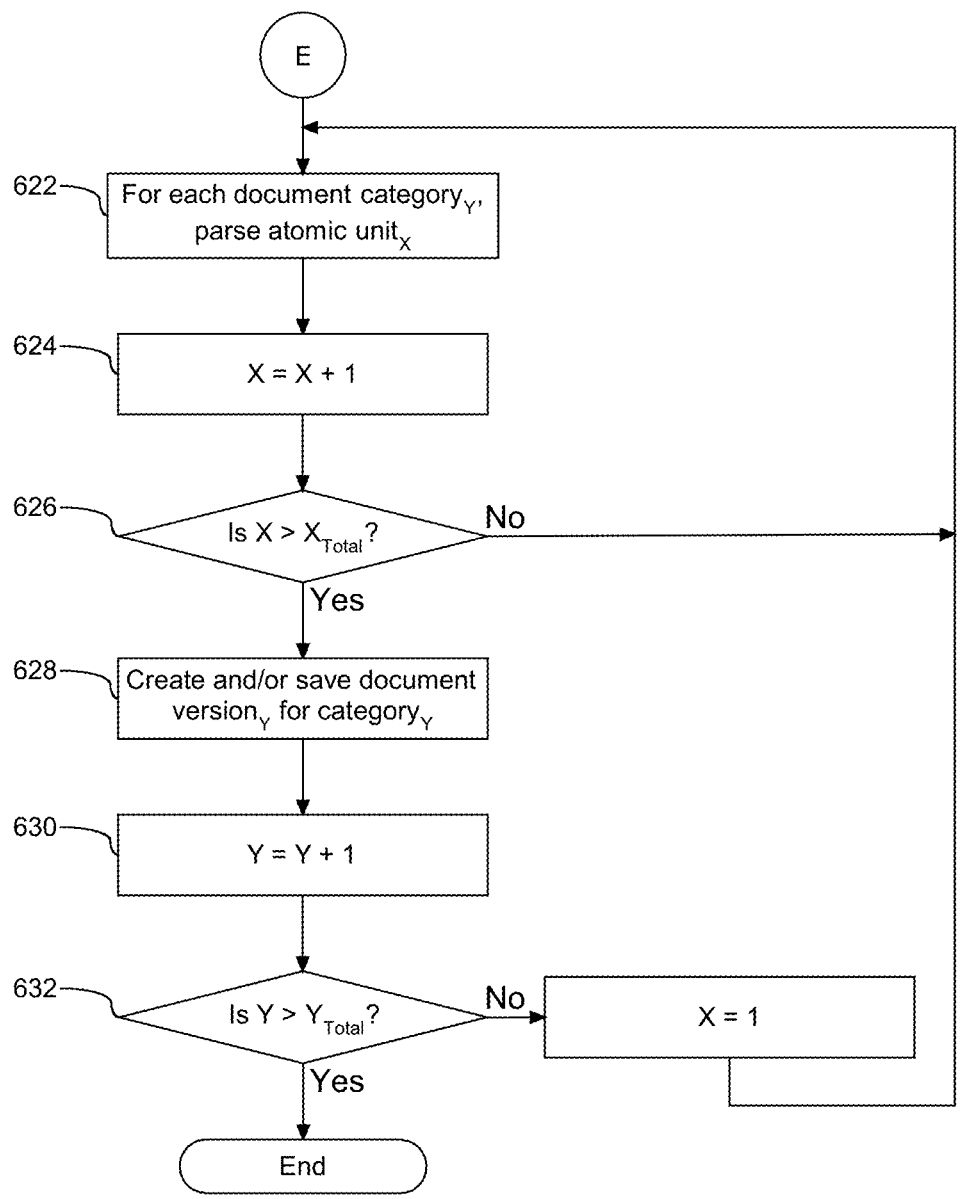

The processes shown and described in FIGS. 3 and 4 are directed at training a ML model with NLP. Referring to FIGS. 6A and 6B, a flow chart (600) is provided illustrating another embodiment for processing a document with respect to one or more recipients. As shown, a document or file and the content contained therein are identified as a master copy (602). In one embodiment, a master copy is a version of the document or file that does not include any content redaction. For descriptive purposes, the elements that comprise the document or file are referred to herein as atomic units. In one embodiment, an atomic unit may be a paragraph, sentence, phrase, or any component that is present in the document or file. An atomic unit is identified (604), and an associated atomic unit counting variable X is initialized (606). More specifically, at step (604) the granularity of the atomic unit is identified and defined. For example, in the case of a text based document, the identification at step (604) specifies whether the atomic unit is a word, phrase, sentence, paragraph, etc., and in one embodiment includes content of the atomic unit. A natural language (NL) processing tool is utilized to identify each atomic unit$_X$ present in the document (608). A machine learning tool assigns atomic unit$_X$ to a class or category$_Y$ commensurate with a hierarchical structure (610), such as the structure shown and described in FIG. 2. In one embodiment, the hierarchical structure has $Y_{Total}$ classes or categories, and each potential recipient or party to the document is assigned to or associated with one class or category. Following step (610), the atomic unit counting variable is incremented (612), and it is determined if the identified document referred to herein as the master copy has completed processing (614). A positive response is followed by assigning the quantity of atomic units, X, to the variable $X_{Total}$ (616), and a negative response is followed by returning to step (608) for continued processing. Accordingly, the master copy of the document or file is processed for atomic unit identification and processing responsive to a hierarchical structure.

Following the atomic unit processing, one or more version of the master copy may be created. It is understood that the master copy is a complete and/or original document version, and an amended copy as described herein has select atomic units removed from the master copy. The atomic unit counting variable, X, is re-initialized (618), and the category counting variable, Y, is initialized (620). For each category, Y, the master copy is reviewed to parse out each atomic unit$_X$ (622). Thereafter, the atomic unit counting variable is incremented (624), and it is determined if all of the identified atomic units have been processed (626). A negative response to the determination is followed by a return to step (622), and a positive response is followed by creating or saving a version of the document or file for category$_Y$ (628). The category counting variable is incremented (630), and it is then determined if the master copy has been processed for each category (632). A negative response to the determination is followed by re-initializing the atomic unit counting variable (634) and returning to step (622), and a positive response concludes the creation of the amended document(s) and associated document version(s). Accordingly, the atomic units are identified and categorized to create one or more amended document versions.

Referring to FIG. 7, a block diagram (700) is provided to illustrating an example data structure (710) as a tool for atomic unit and an assigned label. The data structure shown herein is directed at a master copy of a file or document. In one embodiment, there may be different data structures for different documents and/or files. As shown, the data structure (710) includes three fields, including an entity category (720), an atomic unit (740), and a label (760). The entity category (720) corresponds to the organization, which in one embodiment is reflected in the structure shown and described in FIG. 2. As shown in this example, there are six categories defined in the organization, referred to herein as category$_0$ (722), category$_1$ (724), category$_2$ (726), category$_3$ (728), category$_4$ (730), and category$_5$ (732). The document or file that is the subject of the data structure (710) has been identified with a plurality of atomic units, including unit$_0$ (742), unit$_1$ (744), unit$_2$ (746), unit$_3$ (748), unit$_4$ (750), unit$_5$ (752), unit$_6$ (754), unit$_7$ (756), and unit$_8$ (758). The quantity of atomic units shown and described herein is merely for illustrative purposes and should not be considered limiting. The label field (760) is shown as directed to a binary label. In this example, the label is associated with an atomic unit and assigned to a category. For example, the binary unit 0 may represent an action to hide the atomic unit from the recipient associated with the category, while the binary unit 1 may represent an action to share the atomic unit with the recipient associated with the category. In one embodiment, the binary unit classifications may be inverted. Accordingly, the data structure (710) functions as a representation of atomic units, together with labeling and assignment.

The data structure (710) may be populated by the tools and functionalities shown and described in FIGS. 1-6. For example, in one embodiment, the machine learning model may leverage the data structure to create or amend a document or file version. In addition, the data structure shown herein reflects the organization as reflected in the hierarchical organization, and is subject to modification as and changed in the organization are determined or identified. Similarly, although the data structure (710) is shown herein with two binary labels, this quantity should not be considered limiting. In one embodiment, one or more additional labels may be incorporated. Accordingly, the data structure (710) is an example representation of atomic units and their associated labeling and assignment.

Figure 8:
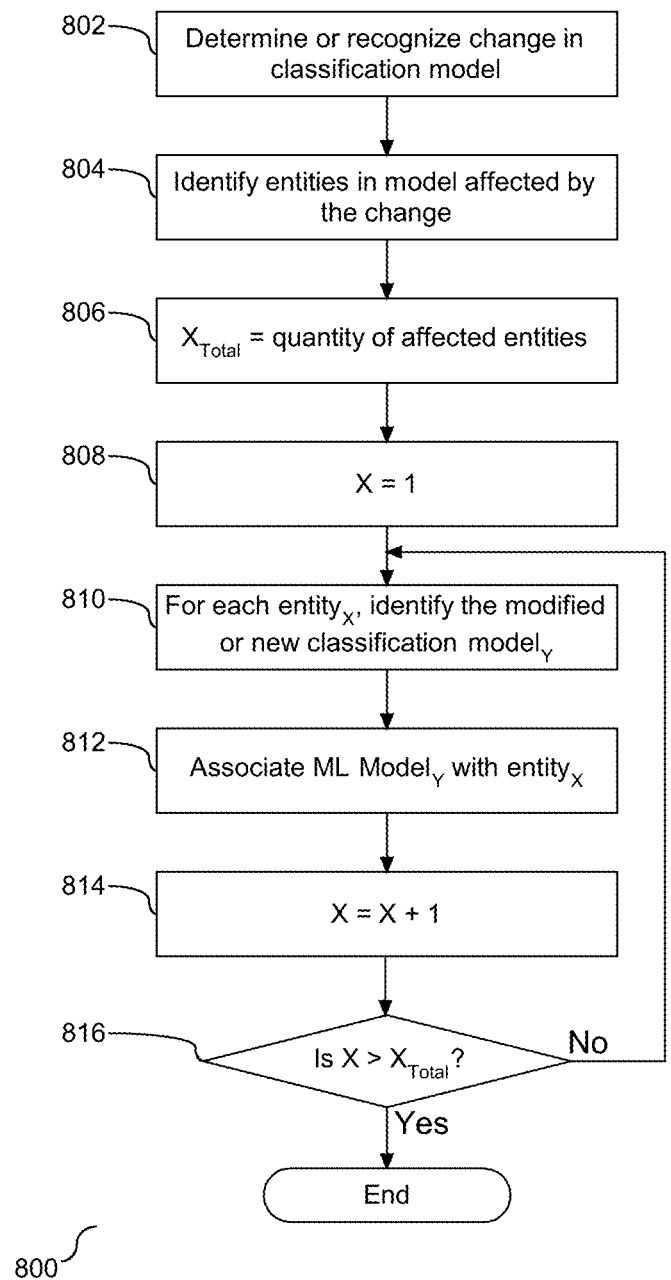
FIG. 8 depicts a flow chart illustrating a process for addressing changes to the organization as reflected in the classification model.

It is understood that the hierarchical structure and/or associated organization is subject to change. Regardless of the reason or basis for the change, the document processing is responsive to the dynamic characteristics of any changes. Referring to FIG. 8, a flow chart (800) is provided illustrating a process for addressing changes to the organization as reflected in the classification model, which in one embodiment may be reflected in a change to the hierarchical structure. The organization may be subject to monitoring, or in one embodiment, a change in the organization may be explicitly defined. At such time as a change in a classification model is determined or otherwise recognized (802), any entities in the organization or structure that are affected by the change are identified (804). The change may be reflected in changing the category for an entity, removing an entity, creating a new category, etc. The variable $X_{Total}$ is assigned to the quantity of entities that affected directly or indirectly by the change, including any new entities that have been added to the structure (806). An associated counting variable X is initialized (808). For each entity$_X$, the modified or new classification is identified (810), Y, and an associated ML model$_Y$ is identified and associated with entity (812). In one embodiment the association between entity$_X$ and model$_Y$ removes any prior entity-model association. Following the association at step (812), the entity counting variable, X, is incremented (814) and it is determined if each of the identified entities have been processed (816). A negative response to the determination is followed by a return to step (810), and a positive response concludes the entity identification and association with a corresponding learning model. Accordingly, the hierarchical structure or categorization is dynamic and subject to change, and as demonstrated herein, the changes are dynamically reflected in a ML model assignment or re-assignment.

As shown and described herein, the supported embodiments may be in the form of a system with an intelligent computer platform for dynamically integrated content processing with classification modeling. Embodiments may also be in the form of a computer program device for use with an intelligent computer platform in order to assist the intelligent computer platform to dynamically integrated content processing and classification modeling. The device has program code embodied therewith. The program code is executable by a processing unit to support the managers and tools of the knowledge engine (150), the classification modeling (see FIG. 2), and the associated processes (see FIGS. 3-8). The content processing supported by the NLP tool (158) may be performed in accordance to slot grammar logic (SGL) or any other form of natural language processing.

With references to FIG. 9, a block diagram (900) is provided illustrating an example of a computer system/server (902), hereinafter referred to as a host (902) in communication with a cloud based support system, to implement the system and processes described above with respect to FIGS. 1-8. Host (902) is operational with numerous other general purpose or special purpose computing system environments or configurations. Examples of well-known computing systems, environments, and/or configurations that may be suitable for use with host (902) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (902) may be described in the general context of computer system-executable instructions, such as program modules, being executed by a computer system. Generally, program modules may include routines, programs, objects, components, logic, data structures, and so on that perform particular tasks or implement particular abstract data types. Host (902) may be practiced in distributed cloud computing environments (910) where tasks are performed by remote processing devices that are linked through a communications network. In a distributed cloud computing environment, program modules may be located in both local and remote computer system storage media including memory storage devices.

Figure 9:
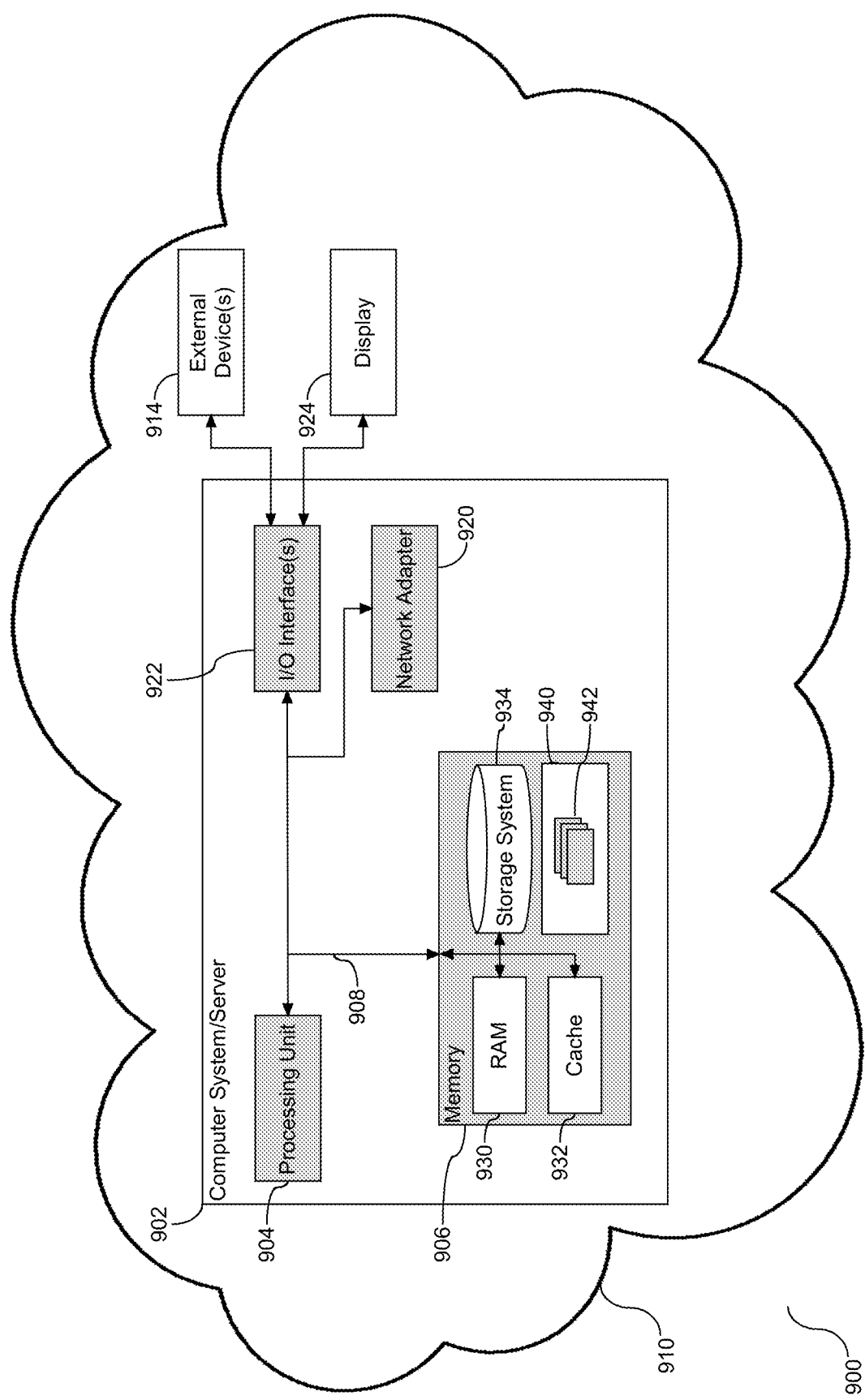
FIG. 9 is a block diagram illustrating an example of a computer system/server of a cloud based support system, to implement the system and processes described above with respect to FIGS. 1-8.

As shown in FIG. 9, host (902) is shown in the form of a general-purpose computing device. The components of host (902) may include, but are not limited to, one or more processors or processing units (904), a system memory (906), and a bus (908) that couples various system components including system memory (906) to processor (904). Bus (908) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (902) typically includes a variety of computer system readable media. Such media may be any available media that is accessible by host (902) and it includes both volatile and non-volatile media, removable and non-removable media.

Memory (906) can include computer system readable media in the form of volatile memory, such as random access memory (RAM) (930) and/or cache memory (932). By way of example only, storage system (934) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (908) by one or more data media interfaces.

Program/utility (940), having a set (at least one) of program modules (942), may be stored in memory (906) by way of example, and not limitation, as well as an operating system, one or more application programs, other program modules, and program data. Each of the operating systems, one or more application programs, other program modules, and program data or some combination thereof, may include an implementation of a networking environment. Program modules (942) generally carry out the functions and/or methodologies of embodiments to cognitive hierarchical content processing and distribution directed at delivery execution. For example, the set of program modules (942) may include the modules configured as the knowledge engine, content manager, classification manager, ML learning tool, and NLP tool as described in FIG. 1.

Host (902) may also communicate with one or more external devices (914), such as a keyboard, a pointing device, a sensory input device, a sensory output device, etc.; a display (924); one or more devices that enable a user to interact with host (902); and/or any devices (e.g., network card, modem, etc.) that enable host (902) to communicate with one or more other computing devices. Such communication can occur via Input/Output (I/O) interface(s) (922). Still yet, host (902) can communicate with one or more networks such as a local area network (LAN), a general wide area network (WAN), and/or a public network (e.g., the Internet) via network adapter (920). As depicted, network adapter (920) communicates with the other components of host (902) via bus (908). In one embodiment, a plurality of nodes of a distributed file system (not shown) is in communication with the host (902) via the I/O interface (922) or via the network adapter (920). It should be understood that although not shown, other hardware and/or software components could be used in conjunction with host (902). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (906), including RAM (930), cache (932), and storage system (934), such as a removable storage drive and a hard disk installed in a hard disk drive.

Computer programs (also called computer control logic) are stored in memory (906). Computer programs may also be received via a communication interface, such as network adapter (920). Such computer programs, when run, enable the computer system to perform the features of the present embodiments as discussed herein. In particular, the computer programs, when run, enable the processing unit (904) to perform the features of the computer system. Accordingly, such computer programs represent controllers of the computer system.

In one embodiment, host (902) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
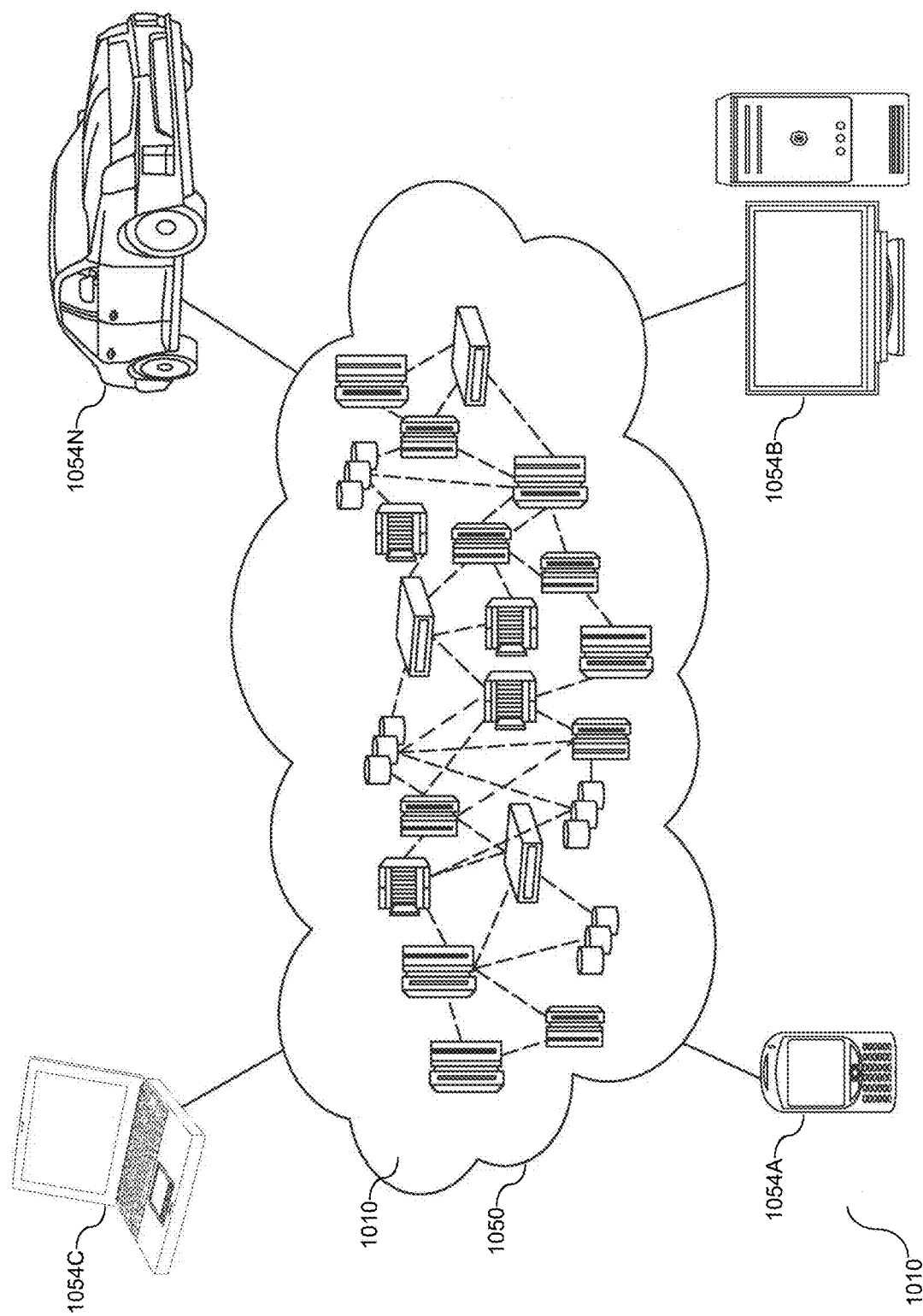
FIG. 10 depicts a block diagram illustrating a cloud computer environment.

Referring now to FIG. 10, an illustrative cloud computing network (1000). As shown, cloud computing network (1000) includes a cloud computing environment (1050) having one or more cloud computing nodes (1010) with which local computing devices used by cloud consumers may communicate. Examples of these local computing devices include, but are not limited to, personal digital assistant (PDA) or cellular telephone (1054A), desktop computer (1054B), laptop computer (1054C), and/or automobile computer system (1054N). Individual nodes within nodes (1010) may further communicate with one another. They may be grouped (not shown) physically or virtually, in one or more networks, such as Private, Community, Public, or Hybrid clouds as described hereinabove, or a combination thereof. This allows cloud computing environment (1000) to offer infrastructure, platforms and/or software as services for which a cloud consumer does not need to maintain resources on a local computing device. It is understood that the types of computing devices (1055A-N) shown in FIG. 10 are intended to be illustrative only and that the cloud computing environment (1050) can communicate with any type of computerized device over any type of network and/or network addressable connection (e.g., using a web browser).

Figure 11:
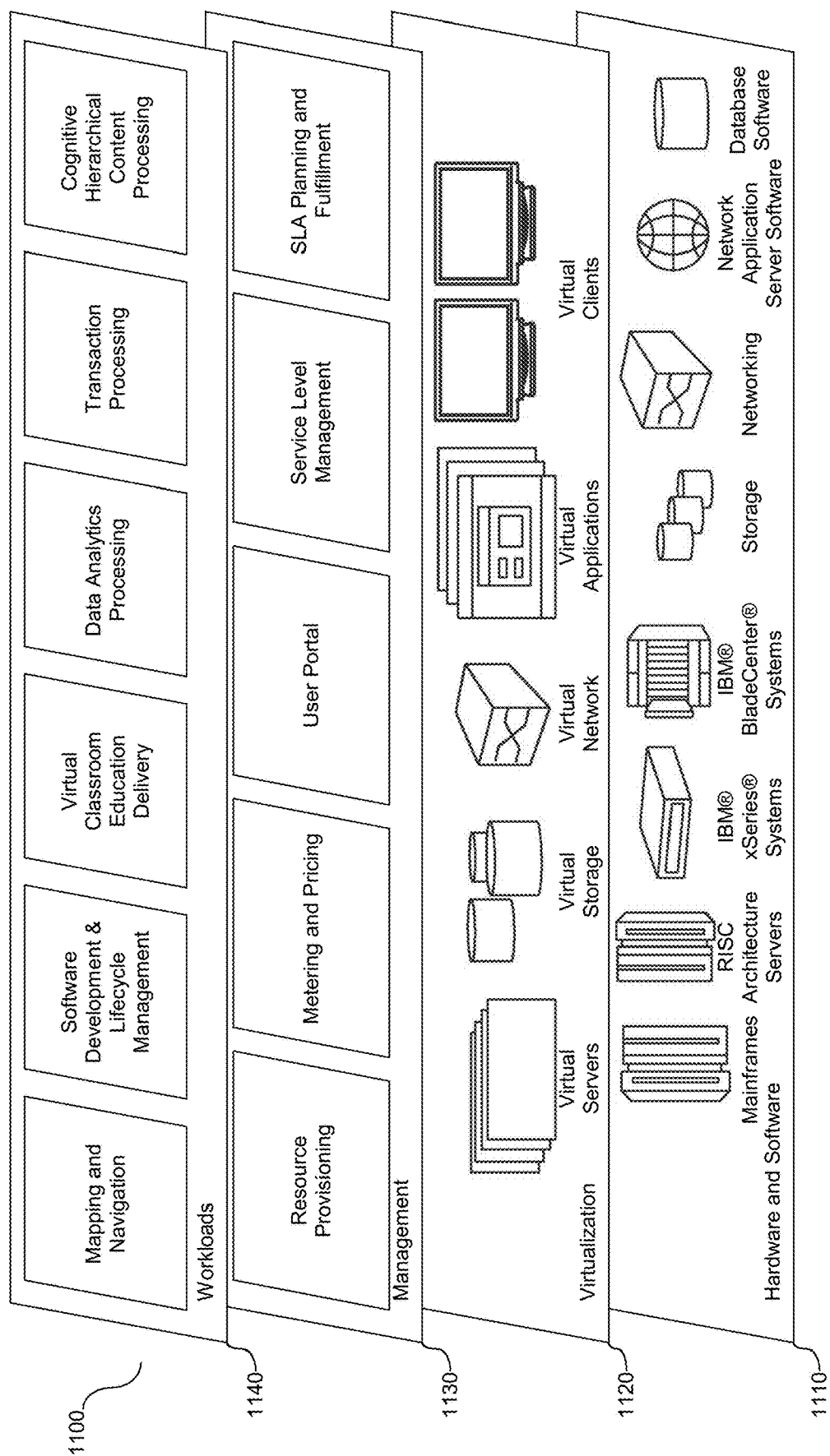
FIG. 11 depicts a block diagram illustrating a set of functional abstraction model layers provided by the cloud computing environment.

Referring now to FIG. 11, a set of functional abstraction layers (1100) provided by the cloud computing network of FIG. 10 is shown. It should be understood in advance that the components, layers, and functions shown in FIG. 11 are intended to be illustrative only, and the embodiments are not limited thereto. As depicted, the following layers and corresponding functions are provided: hardware and software layer (1110), virtualization layer (1120), management layer (1130), and workload layer (1140). The hardware and software layer (1110) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1120) provides an abstraction layer from which the following examples of virtual entities may be provided: virtual servers; virtual storage; virtual networks, including virtual private networks; virtual applications and operating systems; and virtual clients.

In one example, management layer (1130) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1140) provides examples of functionality for which the cloud computing environment may be utilized. Examples of workloads and functions which may be provided from this layer include, but are not limited to: mapping and navigation; software development and life-cycle management; virtual classroom education delivery; data analytics processing; transaction processing; and cognitive hierarchical content processing.

While particular embodiments have been shown and described, it will be obvious to those skilled in the art that, based upon the teachings herein, changes and modifications may be made without departing from the embodiments and their broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to the embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of a machine learning model based on pattern dissection of content and associated classification modeling and processing.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to the disclosed embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the natural language processing may be carried out by different computing platforms or across multiple devices. Furthermore, the data storage and/or corpus may be localized, remote, or spread across multiple systems. Accordingly, the scope of protection of the embodiments are is limited only by the following claims and their equivalents.

What is claimed is:

1. A computer system comprising:
    a processing unit operatively coupled to memory; and
    a tool in communication with the processing unit to process a file in view of a classification model, the tool comprising:
        a content manager configured to partition content present in a document into a plurality of atomic units, the plurality of atomic units comprising at least one first textual atomic unit and at least one second textual atomic unit;
        a classification manager operatively coupled to the content manager, the classification manager configured to correlate the partitioned content with a classification model comprising a hierarchical structure, the hierarchical structure comprising a plurality of classes having respective levels of clearance, including at least a first class having a first level of clearance and a second class having a second level of clearance that differs from the first level of clearance, the correlating comprising to map the atomic units to respective classes of the plurality of classes of the classification model based on the respective levels of clearance;
        a machine learning (ML) model configured to interface with the classification manager, including the ML model configured to dynamically create a plurality of new or amended versions of the document responsive to the mapping of the atomic units to the respective classes of the classification model, the plurality of new or amended versions of the document comprising a first new or amended version of the document populated with a first set of the atomic units associated with the first level of clearance mapped to the first class and a second new or amended version of the document populated with a different second set of atomic units associated with the second level of clearance mapped to the second class, the first and second versions being different from one another based on at least content removal from the document; and
        the classification manager configured to monitor for and detect an amendment to the classification model, and configured to invoke the ML model to dynamically re-calculate the mapping of the two or more atomic units responsive to the detected amendment to the classification model.

2. The system of claim 1, wherein the tool further comprises a natural language processing (NLP) tool operatively coupled to the content manager, the NLP tool configured to detect an amendment to the document content, and to dynamically interface with the ML model responsive to the detected amendment to the document content, including to evaluate the detected amendment to the document content and to classify the amended document content with respect to the classification model.

3. The system of claim 2, wherein the ML model is further configured to interface with the NLP tool, including the NLP tool configured to evaluate the detected amendment for understanding context of the detected amendment and identification of similar context within the document, and the ML model configured to classify the detected amendment to the document content and the similar context responsive to the classification model.

4. The system of claim 1, wherein the plurality of classes are associated with a plurality of classes of recipients, wherein the first class is associated with a first recipient or first recipients, and wherein the second class is associated with a second recipient or second recipients that differ from the first recipient or first recipients.

5. The system of claim 1, wherein the at least one first textual atomic unit and the at least one second textual atomic unit are each a respective word, phrase, sentence, or paragraph of the document.

6. The system of claim 1, wherein the ML model comprises a plurality of ML models, each of the ML models being associated with a corresponding class of the plurality of classes of the classification model.

7. The system of claim 1, wherein the plurality of classes having respective levels of clearance is directed to intended recipients having the respective levels of clearance.

8. A computer program product to process a file in view of a classification model, the computer program product comprising:
    a computer readable storage device having program code embodied therewith, the program code executable by a processing unit to:
        partition content present in a document into a plurality of atomic units, the plurality of atomic units comprising at least one first textual atomic unit and at least one second textual atomic unit;
        correlate the partitioned content with a classification model comprising a hierarchical structure, the hierarchical structure comprising a plurality of classes having respective levels of clearance, including at least a first class having a first level of clearance and a second class having a second level of clearance that differs from the first level of clearance, the correlation comprising to map the atomic units to respective classes of the classification model based on the respective levels of clearance;
        invoke a machine learning (ML) model to dynamically create new or amended versions of the document responsive to the mapping of the atomic units to the respective classes of the classification model, the plurality of new or amended versions of the document comprising a first new or amended version of the document populated with a first set of the atomic units associated with the first level of clearance mapped to the first class and a second new or amended version of the document populated with a different second set of atomic units associated with the second level of clearance mapped to the second class, the first and second versions being different from one another based on at least content removal from the document; and
        monitor for and detect an amendment to the classification model, and to invoke the ML model to dynamically re-calculate the mapping of the two or more atomic units responsive to the detected amendment to the classification model.

9. The computer program product of claim 8, the computer readable storage device further comprising program code executable by the processing unit to process natural language (NL), including to detect an amendment to the document content, and dynamically interface with the ML model responsive to the detected amendment to the document content, including program code executable by the processing unit to evaluate the detected amendment to the document content and to classify the amended document content with respect to the classification model.

10. The computer program product of claim 9, the computer readable storage device further comprising program code executable by the processing unit to evaluate the detected amendment for understanding context of the detected amendment and identification of similar context within the document, and the ML model having program code executable by the processing unit to classify the detected amendment to the document content and the similar context responsive to the classification model.

11. The computer program product of claim 8, wherein the plurality of classes associated with a plurality of classes of recipients, wherein the first class is associated with a first recipient or first recipients, and wherein the second class is associated with a second recipient or second recipients.

12. The computer program product of claim 8, wherein the ML model comprises a plurality of ML models, each of the ML models being associated with a corresponding class of the plurality of classes of the classification model.

13. The computer program product of claim 8, wherein the plurality of classes having respective levels of clearance is directed to intended recipients having the respective levels of clearance.

14. A computer-implemented method comprising:
using a computer processor:
  partitioning content present in a document into a plurality of atomic units, the plurality of atomic units comprising at least one first textual atomic unit and at least one second textual atomic unit;
  correlating the partitioned content with a classification model comprising a hierarchical structure, the hierarchical structure comprising a plurality of classes having respective levels of clearance, including at least a first class having a first level of clearance and a second class having a second level of clearance that differs from the first level of clearance, the correlating comprising mapping the atomic units to respective classes of the plurality of classes of the classification model based on the respective levels of clearance;
  invoking a machine learning (ML) model to dynamically create a plurality of new or amended versions of the document responsive to the mapping of the atomic units to the respective classes of the classification model, the plurality of new or amended versions of the document comprising a first new or amended version of the document populated with a first set of the atomic units associated with the first level of clearance mapped to the first class and a second new or amended version of the document populated with a different second set of atomic units associated with the second level of clearance mapped to the second class, the first and second versions being different from one another based on at least content removal from the document; monitoring for and detecting an amendment to the classification model, and
  dynamically invoking the ML model responsive to an amendment to the classification model, including invoking the ML model to dynamically re-calculate the mapping of the two or more atomic units responsive to the detected amendment to the classification model.

15. The computer-implemented method of claim 14, further comprising a natural language processing (NLP) tool detecting an amendment to the document content, and dynamically interfacing with the ML model responsive to the detected amendment to the document content, including evaluating the detected amendment to the document content, and classifying the amended document content with respect to the classification model.

16. The computer-implemented method of claim 15, further comprising training the ML model to interface with the NLP tool, including the NLP tool evaluating the detected amendment for understanding context of the detected amendment and identification of similar context within the document, and the ML model classifying the detected amendment to the document content and the similar context responsive to the classification model.

17. The computer-implemented method of claim 14, wherein the plurality of classes associated with a plurality of classes of recipients, wherein the first class is associated with a first recipient or first recipients, and wherein the second class is associated with a second recipient or second recipients.

18. The computer-implemented method of claim 14, wherein the at least one first textual atomic unit and the at least one second textual atomic unit are each a respective word, phrase, sentence, or paragraph of the document.

19. The computer-implemented method of claim 14, wherein the ML model comprises a plurality of ML models, each of the ML models being associated with a corresponding class of the plurality of classes of the classification model.

20. The computer-implemented method of claim 14, wherein the plurality of classes having respective levels of clearance is directed to intended recipients having the respective levels of clearance.

* * * * *